United States Patent Office 3,127,356
Patented Mar. 31, 1964

3,127,356
PROCESS FOR THE PREPARATION OF HYDROGENATION CATALYSTS
Jefferson Merritt Hamilton, Jr., Wilmington, Del., and Louis Spiegler, Woodbury, N.J., assignors to E. I. du Pont de Nemours and Company, Wilmington, Del., a corporation of Delaware
No Drawing. Filed Jan. 22, 1959, Ser. No. 788,276
4 Claims. (Cl. 22—447)

This invention is directed to an improved process for the preparation of catalysts for the hydrogenation of organic compounds such as organic nitro compounds in an aqueous system utilizing a metal catalyst deposited on an inert support. The process of this invention is particularly concerned with catalysts for the hydrogenation of 2,4-dinitrotoluene to 2,4-diaminotoluene. The metal catalyst utilized is taken from the group of metals consisting of nickel, palladium and platinum.

It is desirable in industrial hydrogenation processes to employ minimal amounts of the expensive catalysts. At the same time, excessive economy in catalyst usage leads to proportionately low hydrogenation rates and consequent increases in operating costs. It is therefore necessary to strike a balance between the rate of hydrogenation and the cost of the catalyst. Thus, it is advantageous either to improve the hydrogenation activity of the catalyst, or to decrease the cost of its manufacture or both.

One method of obtaining maximum activity from metal catalysts is to deposit the metal upon an inert support at concentrations usually 0.5–2.0% on the weight of the support. Heretofore, it has been believed that the importance of the support lay solely in its effect on the original preparation of the catalyst, and hence, that the catalyst must be prepared at the concentration required for use. However, the preparation of these metal catalysts at such low concentrations on a support necessitates the use of large volumes, and in turn makes the catalyst preparation costly.

It is an object of this invention to provide a process for preparing metal catalysts wherein the use of large volumes in their preparation is avoided by first preparing concentrated loadings and then diluting them to lower concentrations for the hydrogenation process. Another object is to increase the activity of preformed hydrogenation catalysts.

It is a further object of this novel process to increase the hydrogenation rate of preformed hydrogenation catalysts.

More specifically, the present invention is directed to the process of making a hydrogenation catalyst by depositing a compound of platinum, palladium, or nickel on an inert support and then reducing it to the metal, wherein the supported material, at any stage after its deposition on the support, is mixed with an oleophilic carbon having an oil absorption factor of at least 200.

The present invention accomplishes these desired objects by mixing with the supported material, preferably in an aqueous system, an oleophilic carbon having an oil absorption factor of at least 200. The oleophilic carbon is usually non-porous in nature and is preferably added to the system prior to the reduction of the supported metal compound to the metallic catalyst, although good results are also obtained by adding it to the reduced catalytic metal on the support. A thorough mixing of said carbon is then achieved with conventional agitating devices.

The oleophilic carbon added by the process of this invention should have an oil absorption factor of at least about 200. An oil absorption factor is defined as the number of pounds of raw linseed oil, of acid number 2 to 2, per 100 pounds of carbon which causes gelation. This test is the standard method of test for oil absorption on pigments. The greater the oil absorption factor, the more pronounced is the increase of reduction rate. When said factor is much less than about 200, the reduction rate is not sufficiently improved to be economically attractive. The amount of oleophilic carbon used will depend upon the concentration of catalyst loading desired. With noble metal catalysts such as palladium and platinum, a catalyst loading of from about 0.1 to 1% is normally used. With nickel, higher loadings from 10 to 40% are suitable.

The oleophilic carbons as used in this invention are distinct from the carbons usually used as catalyst supports. Conventional carbon supports are porous carbonaceous materials having vegetable or animal origin. The oleophilic carbons on the other hand are prepared from hydrocarbon gases; e.g., acetylene, and are generally termed "furnace blacks." These carbon blacks are normally used for reinforcing rubber products, in inks and pigments and for coloring plastics and paper. Their properties depend upon raw materials, method of preparation, etc., and they vary in surface area, particle size and oil absorption capacity. As a class, these carbon blacks are non-porous in nature.

The following table illustrates the characteristics of oleophilic carbon blacks of varying oil absorption factors which are utilized in this invention:

TABLE I

| Trade-Name of Carbon Black | Approx. Surface Area,c M.2/g. | Percent Ash | Particle Diameter,b Millimicrons | Oil Absorption Factor a |
|---|---|---|---|---|
| Shawinigan Black (i) | 60 | 0.03 | 49.8 | 208 |
| Shawinigan Black (i) | 60 | 0.03 | 49.8 | 225 |
| Shawinigan Black (i) | 60 | 0.03 | 49.8 | 250 |
| Shawinigan Black (i) | 60 | 0.03 | 49.8 | 290 |
| *Shawinigan Black (i) | 60 | 0.03 | 49.8 | 386 |
| *Shawinigan Black (i) | 60 | 0.03 | 49.8 | 395 |

*This carbon black is 50% compressed (bulk density 6.2 lbs./cu. ft.) whereas the other Shawinigan Black is 100% compressed (bulk density 12.5 lbs./cu. ft.). Larger volumes of this carbon are required in the preparation of the catalyst because of its lower bulk density.
(i) Conductive Furnace Black—Acetylene Carbon Black. Commercially available from The Shawinigan Co., Ltd.
a Oil absorption factor: Pounds of oil required to wet 100 pounds of carbon. Standard rub-out method using raw linseed oil of 2–4 Acid No.
b Particle diameter: Arithmetic mean diameter measured from electron micrograph.
c Surface area determined by nitrogen absorption isotherm.

The hydrogenation catalysts to which the oleophilic carbon can be added may be nickel, palladium or platinum deposited on an inert support. The support in turn may be carbon (either porous or non-porous), diatomaceous earth, silica, or other inert material.

The platinum and palladium catalysts of this invention may be activated by incorporating oxides or hydroxides of metals, such as iron, nickel, cobalt, magnesium, aluminum, manganese, chromium, vanadium, and tungsten, all of which effect an activating influence. Combinations of activators may be used; and, the fluorides of boron and silicon may also be used as activators. The activator may be added at various stages during the preparation of the catalyst, such as before, during or after precipitation of the palladium from solution as an hydroxide or a carbonate.

The metallic hydrogenation catalyst (or the compounds reducible to hydrogenation catalysts) to which the oleophilic carbon is added may be prepared in the conventional manner by precipitation onto the inert support by chemical means. Heretofore it was necessary to prepare the catalyst at the concentration or loading required for use; however, by using the technique of the present invention, it is possible to prepare the catalyst or the catalyst intermediate at high concentrations which can then be diluted with the oleophilic carbon to the desired concentration and, in the case of the catalyst intermediate, subsequently reduced. For example, with a noble metal catalyst, a concentration of said noble metal on the inert support can now be prepared and then be diluted with the oleophilic carbon to the desired concentration, usually from about .1 to 1%. It is by preparing this concentrated noble metal catalyst and subsequently diluting the same that great economies of catalyst preparation are realized.

This dilution of the concentrated supported catalyst or catalyst intermediate with the oleophilic carbon may be accomplished in various ways. The concentrated supported material may be mixed with the oleophilic carbon in the form of a slurry, paste, or filter cake, thus making it unnecessary to remove all the water in which it is prepared. On the other hand, the concentrated catalyst or intermediate may be in dry form. The oleophilic carbon may be added either wet, for example, in the form of a slurry, or dry. In dry form, it may be mixed with the dry catalyst, for example, by ball milling, or may be stirred directly into the aqueous pastes or slurries. One convenient and effective method is merely to add the oleophilic carbon and the concentrated catalyst or catalyst intermediate to the system in which the catalytic hydrogenation is to be carried out and then bring about the preparation of the active dilute catalyst by stirring. No matter how the oleophilic carbon is incorporated, the catalyst finally becomes distributed upon it. Particularly when it is mixed with a highly loaded catalyst intermediate (that is, a metal hydroxide) on an oleophilic carbon support, followed by reduction to the active metal catalyst, the latter is found to be uniformly distributed upon all of the support and the catalyst is indistinguishable, in both activity and structure as shown by the electron microscope, from the catalyst made by precipitation in one step on all of the oleophilic carbon.

Representative hydrogenations to which this oleophilic carbon addition can be actively applied are those catalytic hydrogenations of nitro compounds yielding amines, hydroxyamines, and oximes. This process is particularly applicable to the reduction of 2,4-dinitrotoluene to 2,4-diaminotoluene. The nitro compound, however, is not limited to a nitrotoluene, but may be aromatic, aliphatic, cyclic or acyclic compounds. Straight chain nitro compounds as well as branch chain compounds can be reduced with improved results by use of this process.

Another advantage of the present invention is that it makes possible the improvement of preformed catalysts, such as commercial preparations by the simple process of mixing them with oleophilic carbon. Thus the advantages of conventional catalyst supports may be readily combined with the increased activity due to the oleophilic carbon.

A few representative compounds which may be reduced to the amine product are nitrobenzene, 5-nitroquinoline, nitrocyclohexane, beta-nitronaphthalene, 3-nitroquinoline, 1,5-dinitronaphthalene, p-nitroanisole, dinitrostilbene, disulfonic acid sodium salt, p-nitrobenzoic acid sodium salt and p-nitrophenol.

Examples illustrating this novel process follow.

*Example I*

A dispersion of 5.6 parts of an acetylene black of oil absorption factor 290 in 175 parts of water is prepared and 15 parts of $NaHCO_3$ added. The mixture is stirred at room temperature for 30 minutes and then a solution of 0.935 part of $PdCl_2$ in 40 parts of 0.55% HCl (the $PdCl_2$ was dissolved in the HCl solution at 90° C.) and 2.72 parts of $FeCl_3 \cdot 6H_2O$ in 50 parts of water is added. The mixture is heated to 95° C. and held for 1 hour after which it is filtered hot and the precipitate, consisting of hydroxides of palladium and iron on carbon, is washed with 75 parts of water.

The catalyst paste thus obtained represents a loading (i.e., concentration of palladium on support) of 10% and contains 22% solids. This concentrated catalyst intermediate is stable and may be kept until ready for use, at which time it is diluted to the desired concentration by addition of an oleophilic carbon and finally reduced to the metallic catalyst itself.

A catalyst containing 0.91% Pd loading is prepared from the above 10% unreduced catalyst intermediate paste by mixing 2.3 parts of the 10% paste with 5 parts of an oleophilic carbon having an oil absorption factor of 290 and then reducing with hydrogen. This catalyst, in this amount, is used in the hydrogenation of 2,4-dinitrotoluene to 2,4-diaminotoluene given below. The same results are obtained when the equivalent quantities of oleophilic carbon and 10% catalyst intermediate paste are separately added as described below.

A steel or nickel-clad pressure reactor, which is jacketed for heating or cooling with water, and which is equipped with baffles and an efficient agitator that rotates at 800–900 r.p.m., is used for the hydrogen reduction. The reactor is charged to about 20–25% of its capacity with 800 parts of a 62–63% by weight solution of 2,4-diaminotoluene at 75–85° C. and 2.3 parts of wet unreduced 10% catalyst paste prepared as above and 5 parts of oleophilic carbon of oil absorption factor 290. This gives a catalyst loading of 0.91% of noble metal with respect to total carbon. The autoclave is then pressured with hydrogen to 105 p.s.i.g. and the agitator is started. The temperature of the stirred mixture is adjusted to 80±2° C. Molten 2,4-dinitrotoluene is then fed in under pressure in portions of approximately 52.8 parts each, to the agitation mass. As the dinitrotoluene is reduced, a drop in pressure is observed due to consumption of the hydrogen. An external hydrogen reservoir limits this pressure drop to about 10 p.s.i. This pressure drop is also accompanied by a rise in temperature. The temperature is controlled between 90 and 100° C. during the reaction by circulation of 78–80° C. water through the jacket.

After each portion of dinitrotoluene is reduced, the system is repressured with hydrogen to 105 p.s.i.g. prior to adding another portion of dinitrotoluene. Each portion of the nitro body is practically all hydrogenated before adding the next portion. Alternately, if more convenient, hydrogen can be supplied continuously to the reaction mass at constant pressure of 100 p.s.i.g. as rapidly as it is consumed by the reaction.

The time required to reduce each portion of the nitro body can be observed and recorded on a pressure recorder. The rate of reduction at 100 p.s.i.g. (average), i.e., parts of nitro body reduced/minute/part of catalytic metal can be calculated by dividing the weight of nitro compound reduced by the product of the time required for its hydrogenation multiplied by the weight of catalyst metal used.

When the reactor is filled to 75–80% of its total volume, the feeding of the nitro body and hydrogen is stopped. If the feed of the nitro body is free of catalyst poisons, and pure hydrogen is used, the catalyst will still be active, and it can be used to reduce more compound. However, exposure of the catalyst to the atmosphere in the presence of the diamine has a detrimental effect on the catalytic activity. To reuse or recycle catalyst, it is convenient to allow the reduction mass to stand at 75–80° C. without agitation in the reactor and let the bulk of the catalyst settle out. 2,4-diaminotoluene solution (60–62% conc.) is then decanted overhead from the settled catalyst. Sufficient liquid, containing about 75–80% of total quantity catalyst, is left in the reactor to provide a "heel" for resuming the reduction operation as described above. Prior to feeding more dinitro body, 0.01 to 0.02 part of new catalytic metal is added to the settled slurry to compensate for catalyst withdrawn in the decanted liquors.

The decanted liquor is filtered from suspended catalyst and water distilled from the resulting solution of the 2,4-diaminotoluene product. The product is finally isolated by distillation under diminished pressure. In this manner, 5702 parts of 2,4-dinitrotoluene are reduced with 0.1 part of catalyst metal at a rate of 300 parts of 2,4-dinitrotoluene per minute per part of catalyst metal to yield 3660 parts of 2,4-diaminotoluene (96% of theory) boiling at 160–166°/15 mm. and having a freezing point of 96.2° C.

Analysis: percent MTD, M.W. 122 (by coupling value)=100.0. Percent N, found/calc.=22.85/22.95.

When not diluted, the catalyst of 10% concentration yields a reduction rate of about 150 parts dinitrotoluene per minute per part of catalyst metal.

When the above procedure is carried out with conventional catalysts such as those described by Benner et al., U.S. 2,619,503, the reduction rate is about 30 parts of dinitrotoluene per minute per part of catalyst metal.

Example II

Using the same equipment and technique described in Example I, a number of various catalysts on different supports were prepared and after dilution with oleophilic carbon used for hydrogenation of 2,4-dinitrotoluene. In all cases, yields were high and the amine isolated was of good purity. Table II indicates the various catalysts, conditions and the improvement in hydrogenation rate that is obtained. In all four cases, the original catalyst support is a non-oleophilic carbon (oil absorption less than 200) and the metal is formed by reduction before the addition of the oleophilic carbon. Even with this order of addition, an important increase in activity is obtained.

TABLE II
EFFECT OF CATALYST DILUTION WITH OLEOPHILIC CARBON (SHAWINIGAN BLACK)

| Catalyst and Loading | Reduction Rate, parts DNT/min./part cat. | After Addition of Carbon | |
|---|---|---|---|
| | | Percent Loading | Reduction Rate, parts DNT[d]/min./part cat. |
| 1% Pt on Spheron #6 [a] | 132 | 0.5 | 176 |
| 1% Pt on Darco G–60 [b] | 132 | 0.5 | 282 |
| 3.1% Pd on Darco G–60 [b] | 151 | 0.7 | 264 |
| 1% Pd on Carbon Dried at 100° C.[c] | 210 | 0.5 | 264 |

[a] A medium processing channel black available from Godfrey L. Cabot, Inc.
[b] An activated carbon available from the Atlas Powder Co.
[c] Dry catalyst purchased from Baker & Co.
[d] DNT=2,4-dinitrotoluene.

Example III

The catalyst to be treated with oleophilic carbon is a commercial product with a 30% loading of reduced nickel on a porous decolorizing carbon (Darco G–60). Without further treatment it hydrogenates 2,4-dinitrotoluene at the rate of 1.92 parts per minute per part of nickel at 150 lbs. p.s.i. pressure. When slurried in water and mixed by stirring with enough oleophilic carbon black to reduce the loading to 24%, the rate of hydrogenation is increased to 2.40 parts per minute per part of nickel.

Similar improvement was obtained when the nickel catalyst treated was a commercial product supported on diatomaceous earth.

Example IV

In accordance with the procedure of Example I, an activated catalyst is prepared consisting on a dry basis of 0.05 part Pd, 0.05 part $Fe^{+3}$ and 1.0 part Shawinigan Acetylene Black. This catalyst which represents a loading of 5% Pd on the support is diluted by the addition of an oleophilic carbon having an oil absorption factor of 290 (Shawinigan Acetylene Black) so that the concentration of palladium on the total amount of carbon is about 1%.

The diluted catalyst is used for hydrogen reduction of nitrobenzene to aniline at 90–95° C. and at 50 lb. pressure (gage) by the technique described in Example I. A 96% yield of aniline of good purity is obtained.

Example V 5.6 parts of an oleophilic carbon having an oil absorption factor of 290 is stirred at room temperature with 100 parts water containing 10 parts sodium bicarbonate. A solution of one part of ferrous chloride ($FeCl_2.4H_2O$) dissolved in 30 parts of water is added dropwise in 15 minutes. This is followed by dropwise addition of a solution of 0.42 part of palladium chloride, 0.08 part of chloroplatinic acid in 20 parts of 0.55% hydrochloric acid diluted with 20 parts of water. The slurry is now heated to 95° C. and held at this temperature for one hour. The platinum content is reduced by the ferrous iron to metallic platinum with the formation of ferric hydroxide. The resultant paste (24 parts), isolated by filtration and washing with 50 parts of water, consists of a mixture of carbon black, palladium hydroxide, metallic platinum and iron hydroxides ($Fe^{++}$ and $Fe^{+++}$). The wet catalyst represents a loading on a dry basis of 4.5% Pd, 0.54% Pt and 5% Fe. This catalyst is used in reaction with hydrogen by "diluting" with 10 parts of Shawinigan Black (oil absorption factor 290) for each 8.6 parts of the paste. Reduction rate is 700 parts of dinitrotoluene per minute per part of catalytic metal. When not diluted but used at 5% concentration, the reduction rate is about 350 parts DNT/min./part of cat. When repeated with Shawinigan Black of an oil absorption factor of 395 a reduction rate of about 800 parts DNT/min./part of catalyst is achieved.

Example VI

Hydrogen reduction of 2-nitropropane by addition of 10 part portions of 2-nitropropane to a slurry of 600 parts of water, 10 parts of catalyst paste as prepared in Example I and "diluted" with 20 parts of Shawinigan Black at 75° C. under hydrogen pressure of 500-lb. (gage) yields, after filtration from catalyst, a solution of 2-aminopropane (isopropylamine) (71% yield). Small amounts of unreduced nitro body, if present in the amine solution, can be separated by conversion of the amine to its water-soluble hydrochloride or sulfate. Concentration of the amine salt solution, followed by basification, and distillation yields the anhydrous amine B.P. 32–32.5° C. (uncorr.).

Example VII

A clean reaction kettle is charged with 240 parts of water, agitation started, and 48 parts of sodium chloride added. When the salt is dissolved, 4.06 parts of palladium chloride and 0.672 part of chloroplatinic acid is added. The mixture is then stirred at 30° C. until complete solution of the noble metals is obtained. At this point, 670 parts of water are added and also 13 parts of ferric chloride hexahydrate, and 53.7 parts of a carbon black having an oil absorption factor of 290 and the mixture is stirred for 15 minutes. To this mixture, 144 parts of sodium bicarbonate are added while using about 48 parts of water to wash any solid material adhering on the sides of the kettle into the reaction mass. The mixture is stirred 30 minutes and heat is then applied, bringing the mixture up to 90° C. in about 1 hour. After 80 to 90 minutes at 90° C. the reaction is considered complete. The reaction mass is then rapidly cooled to 60° C. and filtered. The press cake obtained is washed by displacement with 190 parts of water and sucked fairly dry.

The catalyst paste as prepared in this manner contains a loading on a dry basis of 4.5% palladium, 0.5% platinum, and 5% ferric iron (as hydroxide) and is preferably diluted with highly oleophilic carbon when used as a reduction catalyst. Preferably, this catalyst is diluted with 100 parts of an oleophilic carbon having an oil absorption factor of about 290 for each 86 parts of the paste and in the reduction of 2,4-dinitrotoluene, a reduction rate of 700 parts of dintrotoluene per minute per part of catalyst metal is obtained.

This application is a continuation-in-part of co-pending application Serial No. 507,477, filed May 10, 1955, now abandoned.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In the process of making a hydrogenation catalyst by depositing a compound of a metal taken from the group consisting of platinum, palladium and nickel on an inert support and then reducing said compound to the metal, the improvement wherein at least 25% of an oleophilic carbon, based on the total dry weight of catalyst, said oleophilic carbon having an oil absorption factor of at least 200 is mixed with an aqueous dispersion of said deposited metal at any stage after its deposition on said inert support, said deposited metal being finely divided.

2. The process of claim 1 wherein the oleophilic carbon has an oil absorption factor of at least 290.

3. The process of claim 1 wherein the final concentration of the catalytic metal in the total catalyst solids is less than about 1%.

4. The process of claim 1 wherein the catalytic metal is a mixture of palladium and platinum, and the oleophilic carbon is an acetylene black having an oil absorption factor of at least 290, said oleophilic carbon being mixed with the deposited metal before its reduction with hydrogen, the final concentration of platinum and palladium in the total catalyst solids being less than about 1%.

References Cited in the file of this patent
UNITED STATES PATENTS

| | | |
|---|---|---|
| 2,600,379 | Doumani et al. | June 17, 1952 |
| 2,727,023 | Evering et al. | Dec. 13, 1955 |
| 2,743,298 | Busk | Apr. 24, 1956 |
| 2,749,359 | Calkins et al. | June 5, 1956 |